United States Patent [19]

Breucha

[11] Patent Number: 4,618,395

[45] Date of Patent: Oct. 21, 1986

[54] CUTTING IMPLEMENT FOR REMOVING PLASTIC SEALING STRIPS FROM JOINTS BETWEEN REINFORCED CONCRETE ELEMENTS

[76] Inventor: Hermann Breucha, Mittelstadtstrasse 52, D-7210 Rottweil, Fed. Rep. of Germany

[21] Appl. No.: 735,312

[22] Filed: May 17, 1985

[30] Foreign Application Priority Data

May 19, 1984 [DE] Fed. Rep. of Germany ..... 34186891

[51] Int. Cl.$^4$ ............................................. B32B 31/18
[52] U.S. Cl. ..................... 156/584; 15/21 E;
15/93 R; 15/111; 15/236 R; 30/172; 30/304;
83/875; 156/80; 156/82; 156/250; 156/344;
156/497; 156/498; 156/523
[58] Field of Search ............ 15/21 E, 93 R, 105,
15/111; 30/169, 172, 304; 83/875, 879, 880;
156/250, 344, 523, 584, 80, 82, 497, 498

[56] References Cited

U.S. PATENT DOCUMENTS

| | | | |
|---|---|---|---|
| 1,954,057 | 4/1934 | Oliver | 156/584 X |
| 2,503,539 | 4/1950 | Aspeek | 30/169 |
| 2,519,645 | 8/1950 | Gilbert | 30/172 X |
| 2,545,379 | 3/1951 | Pomichter | 30/172 |
| 2,987,741 | 6/1961 | Feldman et al. | 15/87 X |
| 3,110,054 | 11/1963 | Askew | 15/236 R |
| 3,167,801 | 2/1965 | Engineer | 30/172 X |
| 3,555,679 | 1/1971 | Sheridan | 30/172 |
| 3,926,714 | 12/1975 | DerMarderosian et al. | 83/875 X |
| 4,083,390 | 4/1978 | Ingham | 83/875 X |
| 4,466,851 | 8/1984 | Hoffman | 156/344 |
| 4,502,223 | 3/1985 | Brookfield | 30/172 X |

Primary Examiner—Robert A. Dawson
Attorney, Agent, or Firm—Balogh, Osann, Kramer, Dvorak, Genova & Traub

[57] ABSTRACT

This invention relates to an implement for removing plastic sealing strips from joints between reinforced concrete elements. The cutting implement provided for that purpose can easily be operated and can be used to provide a clean joint so that such operations can be performed more efficiently. The cutting implement comprises two parallel spaced apart cutting blades, which are transversely adjustable and adapted to extend into the joint containing the plastic sealing strip. The cutting blades are adapted to be longitudinally reciprocated in phase opposition by means of an eccentric or crank drive and are succeeded by conveying means for withdrawing the plastic sealing strip which has been severed on both sides.

17 Claims, 5 Drawing Figures

CUTTING IMPLEMENT FOR REMOVING PLASTIC SEALING STRIPS FROM JOINTS BETWEEN REINFORCED CONCRETE ELEMENTS

BACKGROUND OF THE INVENTION

1. Field of the Invention

This invention relates to a cutting implement for removing plastic sealing strips from joints between reinforced concrete elements, which implement comprises a cutting blade adapted to be inserted into such joints.

2. Description of the Prior Art

When the surfaces of reinforced concrete buildings are to be refinished, the plastic sealing strips contained in the expansion joints between adjacent reinforced concrete elements must be removed. As is apparent from U.S. Pat. No. 3,110,054, that practice previously involved an expensive and inconvenient operation.

SUMMARY OF THE INVENTION

It is an object of the invention to provide a cutting implement which is of the kind described first hereinbefore and can be used thoroughly to remove such plastic sealing strips with a smaller effort and within a shorter time.

That object is accomplished in that two parallel cutting blades are provided, which are transversely adjustable relative to each other and are longitudinally reciprocable in phase opposition by means of a drive comprising an rotatable eccentric member, and the implement is provided with means for receiving the plastic sealing strip which has been severed from the joint by said blades and for removing said plastic sealing strip.

With the cutting implement in accordance with the invention the plastic sealing strips can be removed much more easily and within a shorter time from the joints between reinforced concrete elements.

Desirable further features of the invention are recited in the dependent claims.

BRIEF DESCRIPTION OF THE DRAWINGS

FIGS. 1a and 1b show details of FIG. 1 in fragmentary top plan views.

DETAILED DESCRIPTION OF THE PREFERRED EMBODIMENT

Figure 1:
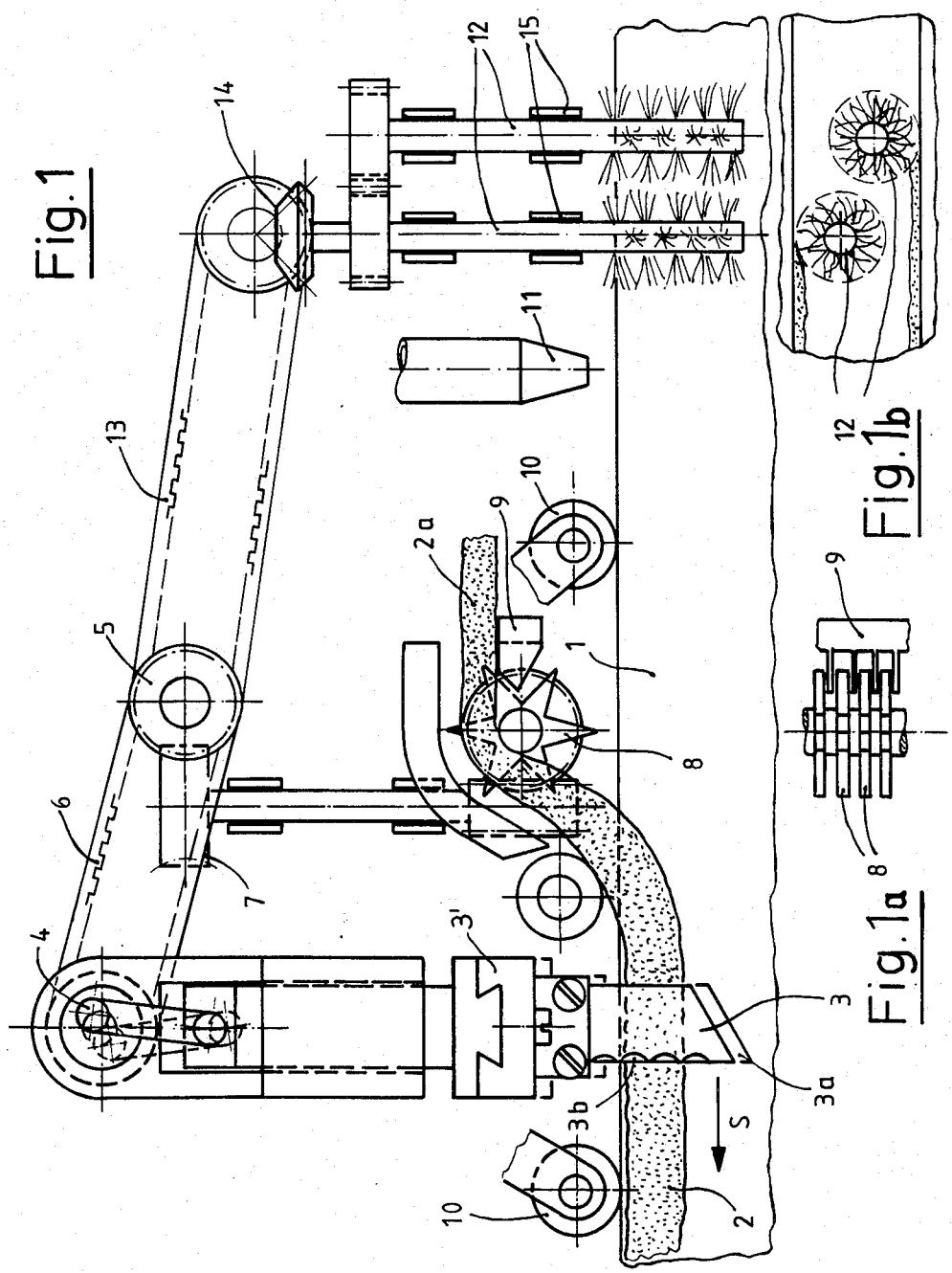
FIG. 1 is a general view showing in side elevation a cutting implement which embodies the invention.

In the embodiment shown in FIG. 1 of the drawings the implement for removing a plastic sealing strip 2 from a joint 1 between reinforced concrete elements comprises two blade holders 3' carrying respective parallel cutting blades 3, which are transversely adjustable to a desired distance "a" in dependence on the width of the joint to be cleared. By means of an eccentric or crank mechanism 4, the cutting blades 3 are longitudinally movable in phase opposition in order to separate the plastic sealing strip 2a in the joint 1 from the adjoining reinforced concrete elements.

A rotary driving member 5 comprises a pinion in mesh with a cogged belt for driving the crank mechanism 4. A worm gear 7 is provided, which comprises a worm non-rotatably connected to the pinion and in mesh with a worm wheel that is connected by a depending shaft to another worm in mesh with a worm wheel that is non-rotatably connected to a conveying roller. The latter comprises a plurality of axially spaced apart, coaxial star wheels 8. A rake 9 is provided, which extends between said star wheels 8 from that side which is opposite to the cutting blades 3. The star wheels are adapted to receive the separated plastic sealing strip 2a from the cutting blades 3 and to deliver said strip via the rake 9.

At the beginning of the cutting operation, after an initial length of the strip has been loosened, the end is manually fed over the star wheels 8, if necessary. Generally, the reciprocating motion of the blades is sufficient to lift out the initial end of the strip so that it can be pushed up by the star wheels 8.

Guide rollers 10 for guiding the cutting implement on the reinforced concrete elements in the feed direction S are provided in front of the cutting blades 3 and behind the star wheels 8.

The parallel cutting blades 3 are reciprocated in their longitudinal direction and extend transversely to the width of the joint and are transversely spaced apart and are detachably mounted in the blade holders 3'. Each knife 3a has a leading longitudinal knife edge 3b, which is scalloped and includes an acute angle with the knife edge at the free end of the blade.

The conveyor roller comprising the star wheels 8 or having a knurled surface serves to remove the plastic sealing strip 2a from the blades 3 and is succeeded by at least one gas burner nozzle 11 for producing a flame for burning the residual plastic sealing material which may have been left on the sides of the joint 1. Instead of a burner, the nozzle 11 may constitute means for directing a chilled nitrogen jet for embrittling the residual plastic sealing material.

At the trailing end of the implement, rotating steel brushes 12 may be provided, which are adapted to extend into the joint 1 and are also driven from the driving member 5 by means of a pinion, a cogged belt 13 and a bevel gear 14. The brushes 12 are provided with shafts, which extend at right angles to the longitudinal and transverse directions of the joint 1 and are mounted in bearings 15.

Figure 2:
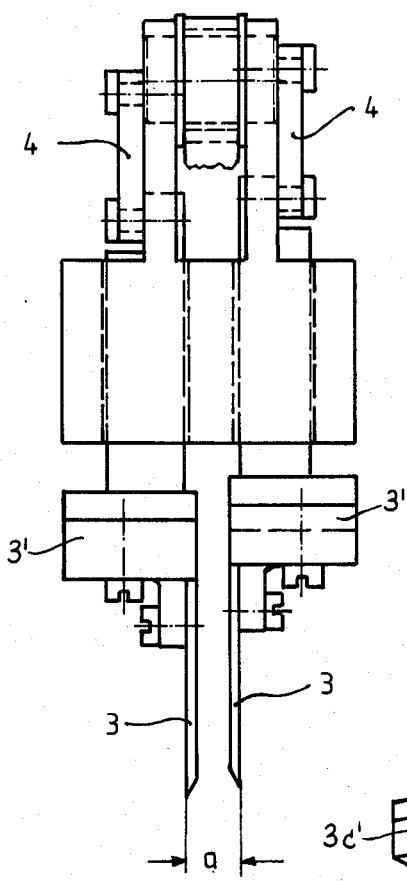
FIG. 2 is a front elevation showing the means for driving the cutting blades.
Figure 2A:
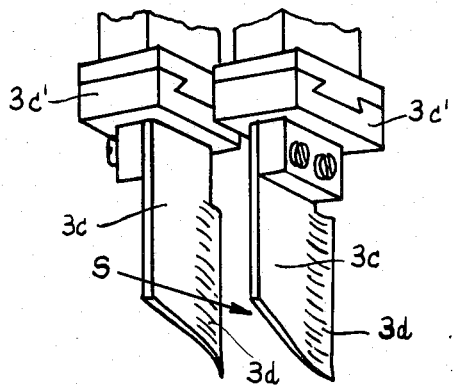
FIG. 2a shows a modified cutting blade.

The implement shown in FIGS. 1 and 2 may be modified in that the cutting blades 3 and blade holders 3' are replaced by the cutting blades 3c and blade holders 3c' shown in FIG. 2a. The cutting blades 3c are resilient and have a leading longitudinal edge and are laterally outwardly curved toward the corner of the joint at the knife edge 3d so that each cutting blade has a concave outside surface at its knife edge. During the severing of the plastic sealing strip in the joint 1, the cutting blades 3c are resiliently biased against the side faces of the joint so that a clean joint will be obtained and the free cutting action of the cutting blades will ensure a reliable removal of the plastic sealing strip from the tool.

I claim:

1. In a cutting implement for removing a plastic sealing strip from a joint between reinforced concrete elements, comprising cutting blade means adapted to be inserted into said joint at said sealing strip, the improvement residing in that said cutting blade means comprise blade holding means and two parallel cutting blades, which are transversely spaced apart and transversely adjustable relative to each other, drive means comprising a rotatable concentric member are coupled to said cutting blades and operable to reciprocate said cutting blades in their longitudinal direction in phase opposition to each other to sever said plastic sealing strip from said reinforced concrete elements when said cutting blades have been inserted into said joint on opposite sides of said sealing strip, and strip conveying means are disposed on one side of said cutting blades and adapted to receive and withdraw said sealing strip from said cutting blades when said sealing strip has been severed from said reinforced concrete elements.

2. The improvement set forth in claim 1, wherein
said strip conveying means comprises a conveying roller and
said drive means comprise a cogged belt for driving said rotatable eccentric member and a worm gear for rotating said conveying roller and rotary drive member for driving said cogged belt and said worm gear.

3. The improvement set forth in claim 2, wherein
rollers for rolling on said reinforced concrete elements at said joint are provided on that side of said cutting blades which is opposite to said conveying roller and on that side of said conveying roller which is opposite to said cutting blades.

4. The improvement set forth in claim 2, wherein said conveying roller comprises a plurality of coaxial star wheels and a rake is disposed on that side of said conveying roller that is opposite to said cutting blades and extends between adjacent ones of said star sheels.

5. The improvement set forth in claim 2, wherein a gas burner nozzle is disposed on that side of said conveying roller which is opposite to said cutting blades and said nozzle is adapted to produce a flame for burning residual plastic sealing material on the sides of said joint.

6. The improvement set forth in claim 2, wherein a nozzle is disposed on that side of said conveying roller which is opposite to said cutting blades and adapted to discharge chilled nitrogen for embrittling residual plastic sealing material on the sides of the joint.

7. The improvement set forth in claim 2, wherein
a nozzle for treating residual plastic sealing material on the sides of the joint is provided on that side of said conveying roller which is opposite to said cutting blades and
rotatable steel wire brushes adapted to extend into said joint are provided on that side of said nozzle which is opposite to said conveying roller.

8. The improvement set forth in claim 7, wherein said drive means comprise a bevel gear for driving said brushes, a gear train for driving said bevel gear and a cogged belt coupled to said rotary drive member and to said gear train.

9. The improvement set forth in claim 7, wherein said steel brushes comprise at least one pair of steel wire brushes for treating opposite side faces of said joint.

10. The improvement set forth in claim 7, wherein
said longitudinal direction of said cutting blades is at right angles to the direction in which said cutting blades are spaced apart and
said steel wire brushes are rotatable on axes which are parallel to said longitudinal direction.

11. The improvement set forth in claim 2, wherein said conveying roller comprises a knurled surface.

12. The improvement set forth in claim 1, wherein said rotatable eccentric member comprises a crank.

13. The improvement set forth in claim 1, wherein said rotatable eccentric member comprises an eccentric.

14. The improvement set forth in claim 1, wherein said cutting blades are detachably mounted in said blade holding means.

15. The improvement set forth in claim 1, wherein each of said cutting blades has a scalloped longitudinal edge remote from said strip conveying means and at its end which is opposite to said blade holding means has a knife edge which includes an acute angle with said longitudinal edge.

16. The improvement set forth in claim 1, wherein
said cutting blades are resilient and are detachably mounted in said blade holding means and
each of said cutting blades has a knife edge at its end that is opposite to said blade holding means and a longitudinal edge which is remote from said strip conveying means and on that side which is opposite to the other of said cutting blades is formed with a concave surface defined by said knife edge and said longitudinal edge.

17. In a cutting implement for removing plastic sealing strips from joints between reinforced concrete elements, comprising cutting blade means adapted to be inserted into said joint at said sealing strip, and drive means coupled to said cutting blade means,
the improvement residing in that
said cutting blade means comprise blade holding means and at least two resilient cutting blades, which are detachably mounted in said blade holding means for movement in opposite directions with respect to each other, and each blade has a knife edge, which is opposite to said blade holding means, and a longitudinal edge and is formed on one side with a concave surface defined by said knife edge and said longitudinal edge.

* * * * *